(12) United States Patent
Woo et al.

(10) Patent No.: US 7,849,060 B2
(45) Date of Patent: Dec. 7, 2010

(54) SYSTEM AND METHOD FOR MANAGING LOG INFORMATION FOR TRANSACTION

(75) Inventors: Kyoung-gu Woo, Seoul (KR); In-sun Kang, Seoul (KR); Kyung-sub Min, Seoul (KR); Young-seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 11/640,287

(22) Filed: Dec. 18, 2006

(65) Prior Publication Data

US 2007/0174355 A1    Jul. 26, 2007

(30) Foreign Application Priority Data

Jan. 10, 2006    (KR) .................... 10-2006-0002867

(51) Int. Cl.
G06F 7/00 (2006.01)
(52) U.S. Cl. .................................................... 707/648
(58) Field of Classification Search .......... 707/200–202
See application file for complete search history.

(56) References Cited

U.S. PATENT DOCUMENTS

| | | | | |
|---|---|---|---|---|
| 5,455,946 A * | 10/1995 | Mohan et al. | ................ | 707/202 |
| 5,724,581 A * | 3/1998 | Kozakura | ................ | 707/202 |
| 5,903,898 A * | 5/1999 | Cohen et al. | ................ | 707/204 |
| 6,185,663 B1 * | 2/2001 | Burke | ................ | 711/156 |
| 6,192,365 B1 * | 2/2001 | Draper et al. | ................ | 707/648 |
| 6,571,259 B1 * | 5/2003 | Zheng et al. | ................ | 707/205 |
| 6,721,765 B2 | 4/2004 | Ghosh et al. | | |
| 6,738,790 B1 | 5/2004 | Klein et al. | | |
| 2002/0103815 A1 | 8/2002 | Duvillier et al. | | |
| 2003/0208464 A1 * | 11/2003 | Lee et al. | ................ | 707/1 |
| 2007/0143360 A1 * | 6/2007 | Harris et al. | ................ | 707/202 |

FOREIGN PATENT DOCUMENTS

| | | |
|---|---|---|
| EP | 0 336 548 A2 | 10/1989 |
| JP | 4-148250 A | 5/1992 |
| KR | 2001-0055981 A | 7/2001 |
| KR | 10-2002-0030223 A | 4/2002 |
| KR | 10-2002-0037399 A | 5/2002 |

OTHER PUBLICATIONS

"AIRIES/SA: A Method for Database Recovery in Client-Server Architectures," by Mohan and Narang. In: SIGMOD 94 (1994), pp. 55-66. Available at: ACM.*
Japanese Office Action issued Apr. 6, 2010, in counterpart Japanese Application No. 2007-000560.

* cited by examiner

*Primary Examiner*—Neveen Abel Jalil
*Assistant Examiner*—Daniel Kinsaul
(74) *Attorney, Agent, or Firm*—Sughrue Mion, PLLC

(57) ABSTRACT

A system and method for managing log information is provided. The system includes an index/record/catalog management module that determines if a page to be updated is newly allocated; a storage management module that manages a free page list and a non-committed free page list and, if the index/record/catalog module determines that the page to be updated is newly allocated, allocating a new page from the free page list or the non-committed free page list; and a buffer management module that sets identification information on a buffer page corresponding to the new page.

10 Claims, 10 Drawing Sheets

SYSTEM AND METHOD FOR MANAGING LOG INFORMATION FOR TRANSACTION

CROSS REFERENCE TO RELATED APPLICATION

This application claims priority from Korean Patent Application No. 10-2006-0002867 filed on Jan. 10, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to managing log information in a database management system, and more specifically, to managing log information to minimize the amount of log information on a data page that is newly allocated.

2. Description of the Related Art

The term "log" or "logging" in a database management system generally means to separately store data before being changed in order to prevent data being changed by a process executed by an application program from having an abnormal value due to a system error or the carelessness of a user.

Logging enables the database management system to perform a cancellation or recovery process to return data processed by an application program that as been abnormally shut down to its original state.

FIG. 1 is a block diagram illustrating the configuration of a log information management system according to the related art.

Referring to FIG. 1, a transaction manager 110 records log information using a log manager 130 when transactions start, end, or are cancelled, and maintains information of the transactions being currently executed. A recovery manager 120 verifies log information through the log manager 130 when a specific transaction is cancelled and then returns changed data to its original state. In particular, when the log information management system is abnormally shut down, the recovery manager 120 removes the effects of an unfinished transaction from a database and reflects a modification of a finished transaction to the database, thereby keeping the data accurate. The log manager 130 merges log information changed in the database by other modules and sends the merged log information to a buffer 160 via a buffer manager 150. In addition, the log manager 130 reads out the log information required by the recovery manager 120 from a disk 180 and provides the read log information to the recovery manager (120).

An index/record/catalog manager 140 is a module for managing index, record, and catalog information items, which are main data forming the log information management system. The index/record/catalog manager 140 requests a buffer manager 150 to load necessary data (index, record, and catalog information items) onto the buffer 160, and to read or change a necessary value. In log information management systems, most of the log information is generated by the index/record/catalog manager 140.

The buffer manager 150 manages the buffer 160 and loads pages having log information on the index, record, or catalog stored in the disk 180 onto the buffer 160 or stores the page loaded onto the buffer 160 in the disk 180, at the request of other modules. A storage manager 170 may perform a process of reading pages from the disk 180 or recording data pages on the disk 180.

The buffer 160 is a part of a memory, and is an exclusive space ensured by the log information management system. Log information is stored in the buffer 160, and FIG. 2 shows a log record, which is an example of the log information, according to the related art.

A log record 200 includes a log header 210, a previous data image 220, and an updated data image 230.

The log header 210 includes a log sequence number (LSN), transaction identification information, previous LSN information, page identification information, offset information, and data length information.

LSN is information for identifying a corresponding log record, and the transaction identification information is identification information of a transaction that causes a change indicated by a corresponding log record. The previous LSN information is identification information of a log record that is generated in the transaction indicated by the transaction identification information immediately before a corresponding log. The page identification information indicates the page on which a changing process included in a corresponding log record is performed. The offset information indicates which position of the page identified by the page identification information the change in data occurs on. The data length information is information indicating the size of changed data.

The previous data image 220 indicates a data value before the data is changed, and the updated data image 230 indicates a data value after the data is changed.

Since the buffer manager 150 reads data from the disk 180 in units of pages, the buffer 160 is also divided and managed in units of pages.

The storage manager 170 reads a specific page from the disk 180 and loads the specific page onto the buffer 160, or records the specific page of the buffer 160 on the disk 180, at the request of the buffer manager 150. When a new page is requested, the storage manager 170 allocates a disk page that is not used at that time as a data storage space. When the existing disk page is not used as a data storage space any longer, the storage manager 170 manages the disk page as one of the empty disk pages. The storage manager 170 may further include a page usage management module that manages the usage of pages.

An application 190 may serve as a query processor or a query engine. The application 190 can notify the transaction manager 110 of the start, cancellation, or end of a transaction, and can read or change log information at a boundary between transactions, that is, between the start of a transaction and the cancellation/end thereof through the index/record/catalog manager 140.

Next, the operation of the components shown in FIG. 1 will be described.

First, when the application 190 requests the transaction manager 110 to start a transaction, the transaction manager 110 generates a new transaction and keeps information on the generated transaction until the transaction is finished.

Then, when the application 190 requests the index/record/catalog manager 140 to update the data, the index/record/catalog manager 140 requests the buffer manager 150 to transmit a necessary page, stores the page in the buffer 160, and performs a necessary update process. Whenever each update process is performed, the index/record/catalog manager 140 creates log information on the data before the change and log information on the data after the change and transmits the log information to the log manager 130. The data update process will be described in detail below.

When it is determined that the data update process has been performed without any errors, the application 190 requests the transaction manager 110 to end a transaction. On the other hand, when it is determined that an error occurs in the data update process, the application 190 requests the transaction manager 110 to stop the transaction.

When the transaction ends, the transaction manager 110 instructs the log manager 130 to create log (hereinafter, referred to as "Commit_Log") information indicating the end of the transaction. Then, the transaction manager 110 requests the log manager 130 to record all log information items including the Commit_Log information on the disk 180. When all of the log information items having LSNs smaller than LSN of Commit_Log are stored in the buffer 160, the log manager 130 requests the buffer manager 150 to record the log information items on a log file of the disk 180.

If the application 190 determines to stop the transaction, the transaction manager 110 requests the recovery manager 120 to cancel the transaction. The recovery manager 120 requests the log manager 130 to transmit log information having a previous data value in order to recover the data values that have been changed in the corresponding transaction. The request is sequentially transmitted to the buffer manager 150 and the storage manager 170 and is then processed.

Then, the recovery manager 120 requests the buffer manager 150 to transmit the data pages to be recovered to the previous values, and the buffer manager 150 reads the requested pages from the buffer 160 by using the storage manager 170. Subsequently, the recovery manager 120 finds the changed portions on the basis of the log information received from the log manager 130 and recovers the previous data values (before image).

After the transaction ends or is cancelled, the transaction manager 110 removes the information of the transaction from a transaction table.

Next, a process performed when the application 190 requests the index/record/catalog manager 140 to update data will be described in detail below.

The index/record/catalog manager 140 identifies the data update on the disk 180 and determines a disk page of the disk 180 to be corrected.

The index/record/catalog manager 140 determines which of update modes the application 190 is requesting. The update modes include a mode of releasing a disk page (a "delete" mode), a mode of recording data on a new page (an "insert" mode), and a mode of changing a data value recorded on the existing page (a "modify" mode).

In the delete mode, when a designated disk page exists in the buffer 160, the buffer manager 150 removes the page from the buffer 160. Then, the buffer manager 150 requests the storage manager 170 to release the designated disk page, and the storage manager 170 puts the corresponding page to a list of unused pages. At that time, since the disk page is changed, the storage manager 170 creates log information on the change and transmits the log information to the log manager 130.

In the insert mode, the buffer manager 150 requests the storage manager 170 to allocate a new page. The storage manager 170 allocates a new page, creates log information on the change of the disk page, and transmits the log information to the log manager 130. Then, the storage manager 170 duplicates the requested disk page on a space of the buffer 160 that is designated by the buffer manager 150. The index/record/catalog manager 140 inserts the data value on the new page, creates log information on the data value, and transmits the log information to the log manager 130.

In the modify mode, the index/record/catalog manager 140 requests the buffer manager 150 to transmit a disk page to be changed. Then, the buffer manager 150 checks whether the disk page is loaded onto the buffer 160. When the page whose data value should be updated exists in the buffer 160, the index/record/catalog manager 140 changes the data value of the page.

However, when the page whose data value should be updated does not exist in the buffer 160, the index/record/catalog manager 140 duplicates the disk page requested by the storage manager 170 on an empty space of the buffer 160 designated by the buffer manager 150. If there is no available empty space, the buffer manager 150 selects a suitable page and downloads the selected page to the disk 180, thereby ensuring an empty space in the buffer 160. Then, the storage manager 170 duplicates the requested disk page to an empty space of the buffer 160 designated by the buffer manager 150. The index/record/catalog manager 140 changes the data value of the corresponding page, creates log information on the changed data value, and transmits the log information to the log manager 130.

Meanwhile, in the database, when a lot of log records are inserted or indexes are created, a large number of pages are newly allocated, and the data values of the allocated pages are changed. However, in the log information management system according to the related art, when all data values are changed, a previous data image (before image) and an updated data image (after image) remain as log information. Therefore, when a certain page is newly allocated as a page for storing index, record, or catalog information and then new data values are written on the entire page, the above-mentioned characteristic causes log information that is twice the size of the newly allocated page to be created. That is, when N data pages are newly allocated and then values are written on the pages, log information corresponding to 2N pages is created. Thus, since all the created log information items should be recorded on a disk before transactions are completed, the performance of the log information management system may deteriorate due to a disk input/output process. In particular, the above may cause serious problems in a system that should perform a process of inserting a large number of records at high speed.

Accordingly, it is necessary to minimize the amount of log information on data pages that are newly allocated and prevent the performance of a system from deteriorating even when a large number of records are inserted or a new index is created.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a technique for minimizing the amount of log information on pages that are newly allocated when transactions occur and to shorten a response time to the insertion of a large number of records and a process of creating a new index, thereby improving the performance of a log information management system.

According to an aspect of the invention, a log information management system includes an index/record/catalog management unit that determines whether a page to be updated is a page that is newly allocated; a storage management unit that manages a free page list and a non-committed free page list and, allocates a new page from the free page list or the non-committed free page list if the page to be updated is the newly allocated page; and a buffer management unit that sets identification information on a buffer page corresponding to the new page. In the log information management system, log information is not created when a data value of the buffer page is changed.

According to another aspect of the invention, a method of managing log information includes determining whether a page to be updated is a page that is newly allocated; allocating a new page from a free page list or a non-committed free page list if the page to be updated is the newly allocated page; and setting identification information on a buffer page corresponding to the new page. In the method, log information is not created when a data value of the buffer page is changed.

BRIEF DESCRIPTION OF THE DRAWINGS

The above and other aspects of the present invention will become more apparent by describing in detail exemplary embodiments thereof with reference to the attached drawings, in which.

Figure 1:
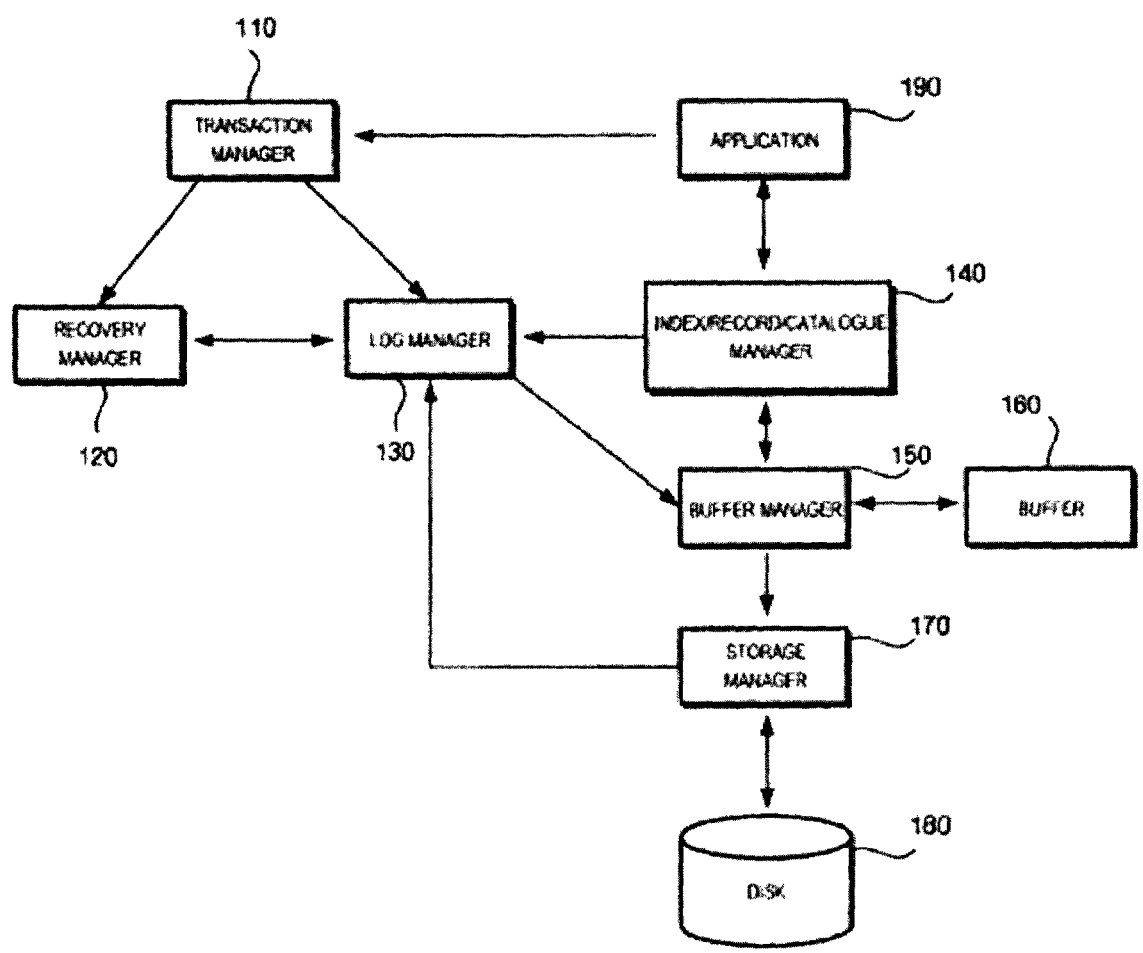
FIG. 1 is a block diagram illustrating the configuration of a log information management system according to the related art.
Figure 2:
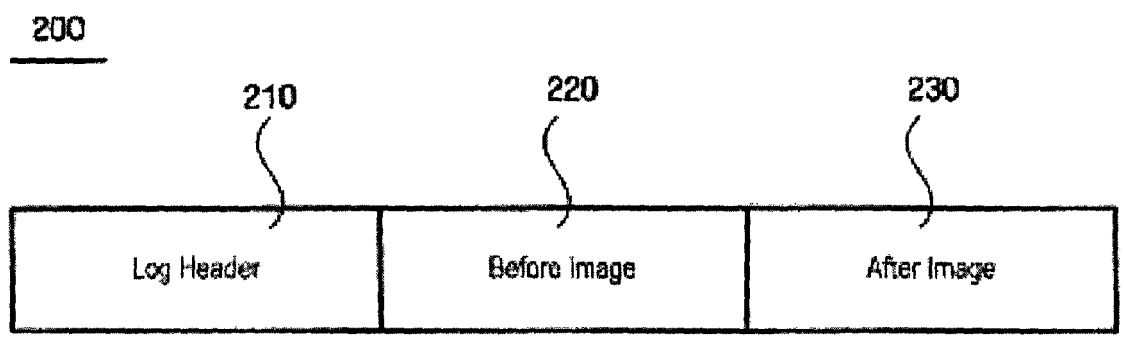
FIG. 2 is a diagram illustrating the structure of a general log record according to the related art.

DESCRIPTION OF THE EXEMPLARY
EMBODIMENTS OF THE INVENTION

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims.

The present invention is described hereinafter with reference to flowcharts and block diagrams for illustrating an apparatus and method for managing log information according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, generate means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The present invention will now be described more fully with reference to the accompanying drawings, in which exemplary embodiments of the invention are shown.

Figure 3:
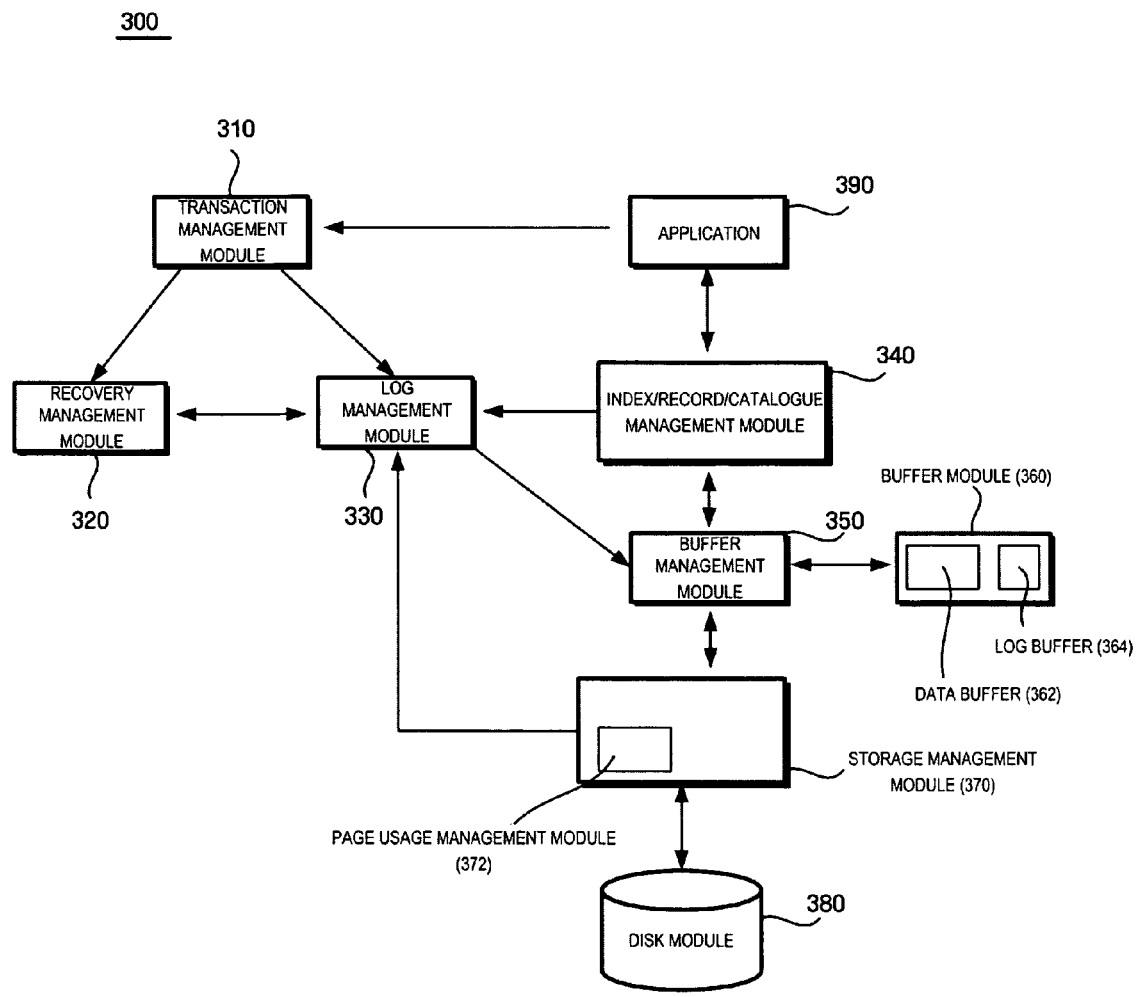
FIG. 3 is a block diagram illustrating the configuration of a log information management system according to an exemplary embodiment of the invention.

FIG. 3 is a block diagram illustrating the configuration of a log information management system according to an exemplary embodiment of the invention.

Referring to FIG. 3, a log information management system 300 includes a transaction management module 310, a recovery management module 320, a log management module 330, an index/record/catalog management module 340, a buffer management module 350, a buffer module 360, a storage management module 370, a disk module 380, and an application 390. The buffer module 360 includes a data buffer 362 and a log buffer 364, and the storage management module 370 includes a page usage management module 372.

The term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a security multimedia card.

The application 390 may serve as a query processor or a query engine. The application 390 can notify the transaction management module 310 of the start, cancellation, or end of a transaction, and can read or change log information at a boundary between transactions, that is, between the start of a transaction and the cancellation/end thereof through the index/record/catalog management module 340.

The transaction management module 310 records log information by using the log management module 330 when a transaction starts, ends, or is cancelled and holds information on the transactions being currently executed.

The recovery management module 320 verifies log information in the log management module 330 when a specific transaction is cancelled, and recovers data to its original state. In particular, if the log information management system 300 is abnormally shut down, the recovery management module 320 removes the effects of an unfinished transaction from a database and reflects a modification of a finished transaction in the database, thereby keeping the data accurate.

The log management module 3-30 merges log information changed in the database by other modules and sends the merged log information to the buffer module 360. In addition, the log management module 330 reads out the log information required by the recovery management module 320 from the disk module 380 and provides the read log information to the recovery management module 320.

The index/record/catalog management module 340 manages index, record, and catalog information items, which are main data formed in the log information management system 300. The index/record/catalog management module 340 requests the buffer management module 350 to load necessary data (index, record, and catalog information items) onto the buffer module 360, and to read or change a necessary value. In the log information management system 300, most of the log information is generated by the index/record/catalog management module 340.

If a data value is updated, the index/record/catalog management module 340 checks whether an updated page is a page that is newly allocated before recording the log information. If it is determined that the page in which the data value is updated is the newly allocated page in a corresponding transaction, the index/record/catalog management module 340 does not record the log information even if the data value is updated.

The buffer management module 350 manages the buffer module 360 and loads pages having log information on the index, record, or catalog stored in the disk module 380 onto the data buffer 362 of the buffer module 360 or stores the page loaded onto the data buffer 362 in the disk module 380, at the request of other modules. The storage management module 370 may perform a process of reading or storing data pages from or in the disk module 380.

The buffer management module 370 selects only data pages having MAX_LSN as a page LSN from the data buffer 362 at the request of the log management module 330 and records all the data pages in the disk module 380. The page LSN may be regarded as identification information for identifying each page.

The buffer module 360 is a part of a memory, and is an exclusive space maintained by the log information management system 300. The buffer module 360 includes the log buffer 364 having log information stored therein and the data buffer 362 having pages stored therein.

The storage management module 370 reads a specific page of the disk module 380 and loads the specific page onto the buffer module 360, or records the specific page of the buffer module 360 in the disk module 380, at the request of the buffer management module 350. If a new page is requested, the storage management module 370 allocates a disk page that is not used at that time as a data storage space. If the existing disk page is no longer used as a data storage space, the storage management module 370 manages the disk page as one of the empty disk pages. The storage management module 370 includes a page usage management module 372 that manages the usage of pages.

In a case in which a corresponding page is allocated from a free page list if a page that is newly allocated is carried into the data buffer 362 of the buffer module 360, the storage management module 370 performs a process of changing the page LSN of the buffer page designated in the data buffer 362 rather than a process of reading a page from the disk module 380. In this case, the free page means a page to which data can be newly allocated, and the free page list is a data configuration for managing the free page and is managed by the page usage management module 372.

If an arbitrary page in the data buffer 362 is carried out from the disk module 380, the page LSN of a specified buffer page is arbitrarily changed and is then stored. The disk input/output operation of the storage management module 370 will be described in detail with reference to FIGS. 7 and 8.

The page usage management module 372 of the storage management module 370 manages the free page list and a non-committed free page list. The non-committed free page list is a list of pages released in an unfinished transaction. If requested to allocate a new disk page, the page usage management module 372 finds an available free page from the free page list and allocates the free page. If there is no available free page in the free page list, the page usage management module 372 finds a free page from the non-committed free page list and allocates the free page. A method of updating a free page and a non-committed free page will be described in detail below with reference to FIG. 9.

Figure 4:
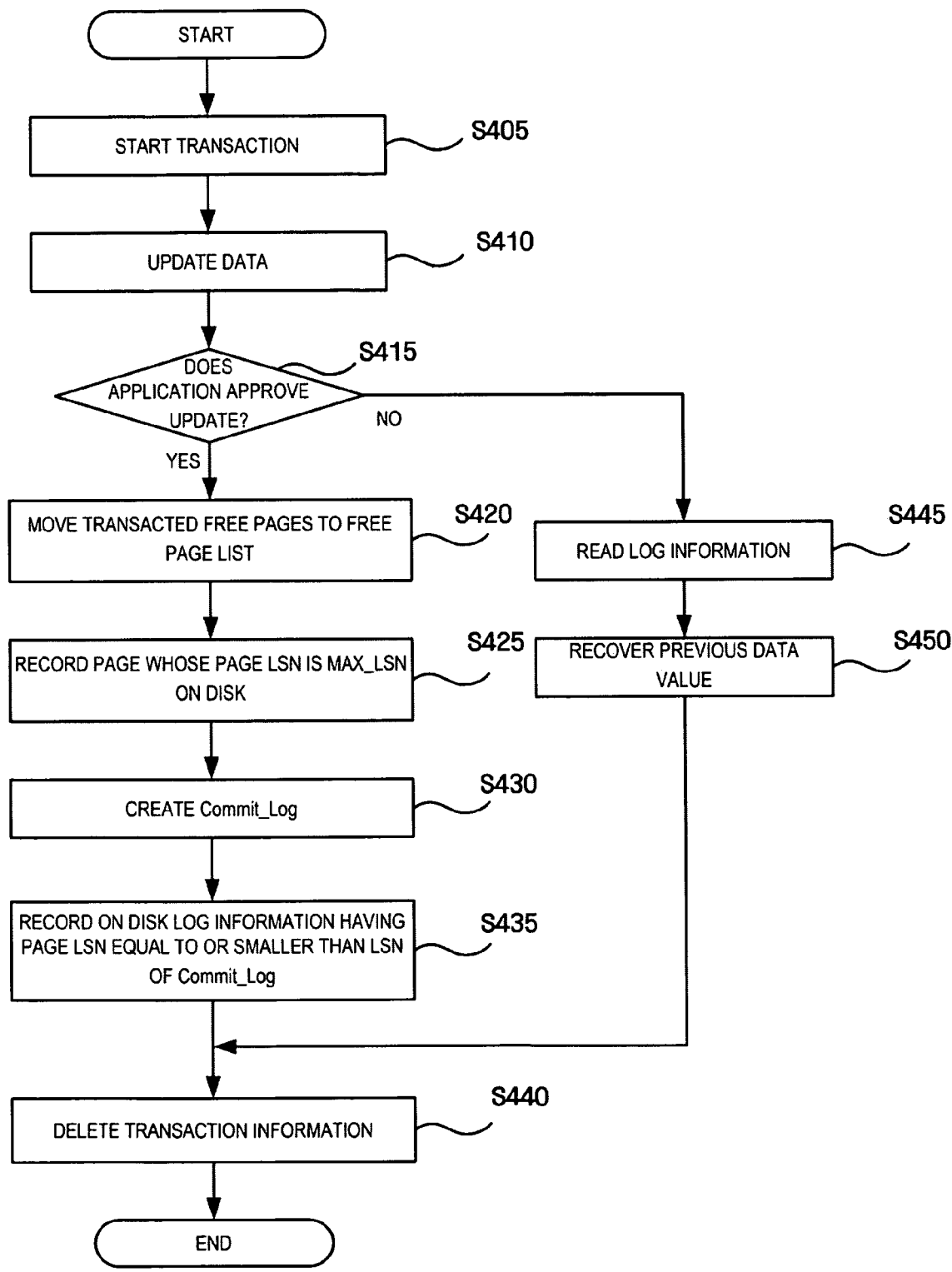
FIG. 4 is a flowchart illustrating an update transaction process according to an exemplary embodiment of the invention.

FIG. 4 is a flowchart illustrating an update transaction process according to an exemplary embodiment of the invention.

First, if the application 390 requests the transaction management module 310 to start a transaction, the transaction management module 310 generates a new transaction and keeps information on the generated transaction until the transaction is finished (S405).

Then, if the application 390 requests the index/record/catalog management module 340 to update data, the index/record/catalog management module 340 requests a necessary page from the buffer management module 350, stores the page on the data buffer 362 of the buffer module 360, and updates the page (S410). In this case, log information on a data page that is newly allocated among the updated pages is not created. Meanwhile, the pages loaded onto the data buffer 364 have page LSNs therein. In the exemplary embodiment of the invention, unnecessary log information is not created since a specific page LSN is set to a page that is newly allocated (for example, MAX_LSN). That is, if the page LSN of the updated page is MAX_LSN, the index/record/catalog management module 340 does not create log information. Here, "MAX_LSN" indicates the maximum LSN that can be created in the log information management system.

A data update process will be described in more detail with reference to FIG. 5.

If it is determined that the data update process is performed without any errors, the application 390 requests the transaction management module 310 to finish a transaction. On the other hand, if it is determined that an error occurs in the data update process, the application 390 requests the transaction management module 310 stop the transaction (S415).

If the application 390 approves the update (S415), information on the pages in the non-committed free page list that are released by a corresponding transaction is reflected on the free page list (S420). According to an exemplary embodiment of the invention, unlike the related art, the pages released in a certain transaction are not immediately put in the free page list, but are put in a separate non-committed free page list and are then managed.

Then, pages that have not been recorded in the disk module 380 yet, among the data pages in the data buffer 362, i.e., pages newly allocated (that is, pages whose page LSNs are MAX_LSN), are recorded in the disk module 380 (S425). In the invention, log information on the newly allocated pages does not remain, but the newly allocated pages are recorded in the disk module 380 before a transaction is completed, which makes it possible to keep the data accurate even if abnormal shutdown occurs after the transaction is completed.

Meanwhile, when the newly allocated pages are recorded in the disk module 380 with the page LSN of MAX_LSN, they may be erroneously regarded as new pages due to the page LSN thereof at the time if the corresponding page is updated in another transaction. Therefore, when recording the newly allocated pages, having a page LSN of MAX_LSN, to the disk module 380, preferably, the storage management module 370 changes the page LSN to a different value and then stores the pages.

After step S425, the transaction management module 310 instructs the log management module 330 to create "Commit_Log" (S430). If all log information items having LSNs smaller than LSN of "Commit_Log" are stored in the log buffer 364, the log management module 330 requests the buffer management module 350 to record the log information items on a log file of the disk module 380 (S435).

If the application 390 does not approve update, that is, if it is determined that the transaction should be stopped, the transaction management module 310 requests the recovery management module 320 to cancel the transaction. The recovery management module 320 requests the log management module 330 to transmit log information items having previous data values in order to recover the data values changed in the corresponding transaction (S445). The request is sequentially transmitted to the buffer management module 350 and the storage management module 370 and is then processed.

Subsequently, the recovery management module 320 finds the changed portions on the basis of the log information received from the log management module 320 and recovers the previous data values (before image) (S450).

After the transaction ends or is cancelled, the transaction management module 310 removes the information of the transaction from a transaction table (S440).

Figure 5:
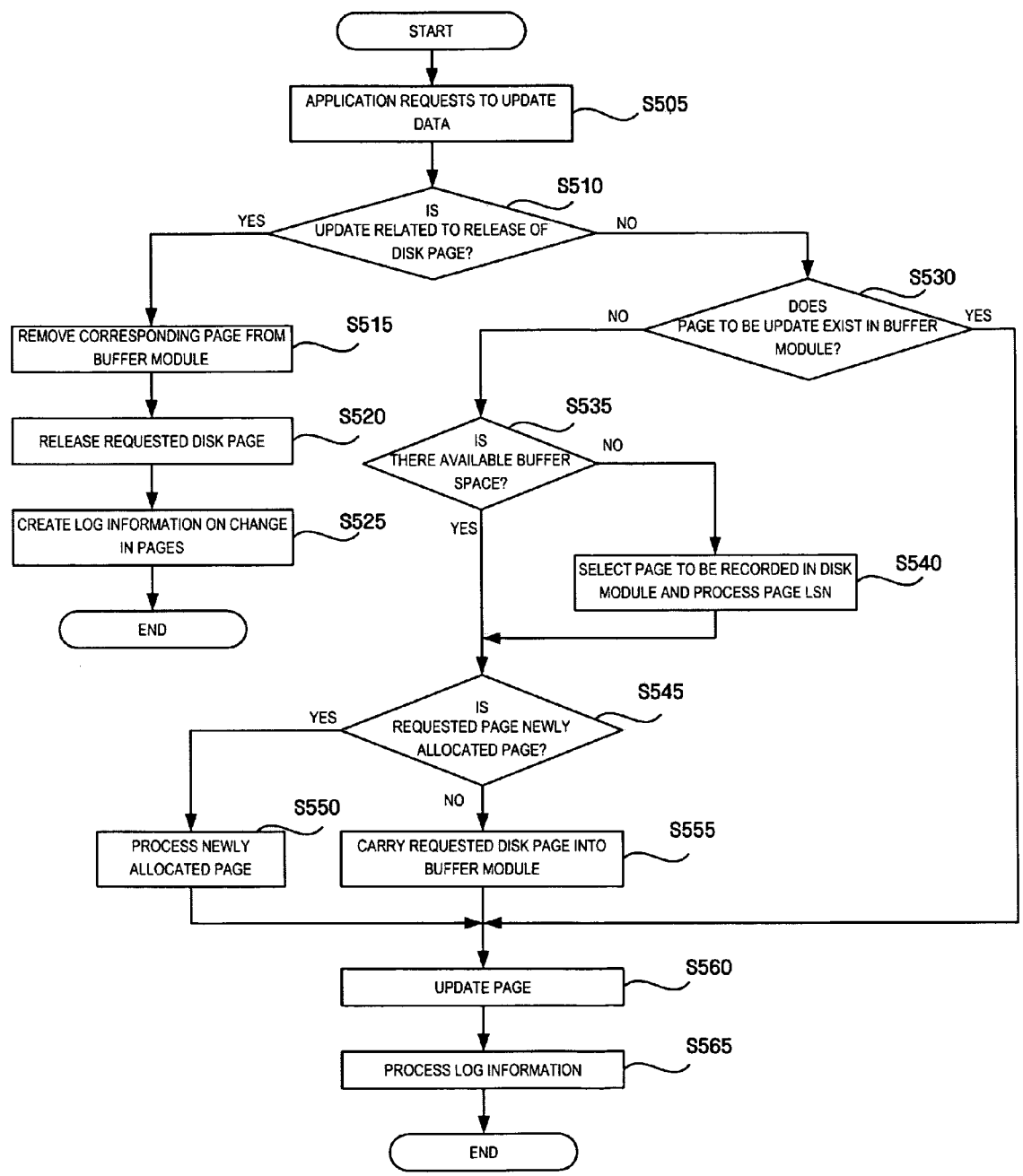
FIG. 5 is a flowchart illustrating in detail a process of updating data according an exemplary embodiment of the invention.

FIG. 5 is a flowchart illustrating a process of updating data according to an exemplary embodiment of the invention.

First, the application 390 requests the index/record/catalog management module 340 to update the data (S505). Then, if the index/record/catalog management module 340 determines that the requested update is an update to release a disk page (S510), the buffer management module 350 removes a corresponding disk page when the disk page is loaded on the data buffer 362 (S515). The page usage management module 372 of the storage management module 370 inserts the number of the released page into the non-committed free page list, and keeps the non-committed free page list until the transaction that releases the page is finished or stops. If the transaction that releases the page is finished, the finished transaction causes all of the released pages to be removed from the non-committed free page list and to be inserted into the free page list. When the transaction stops, the transaction causes all of the released pages to be removed from the non-committed free page list, but the released pages are not inserted into the free page list. In this way, the requested disk page is released (S520).

The storage management module 370 creates log information on a change in pages and transmits the log information to the log management module 330 (S525).

If the index/record/catalog management module 340 determines that the update requested in operation S510 is an update to change the data value of a new page or the existing page, not an update to release the disk page (S510), the buffer management module 350 checks whether a page to be updated exists in the buffer module 360 (S530). If the page to be updated exists in the buffer module 360, the page is updated (S560). On the other hand, if the page to be updated does not exist in the buffer module 360, the buffer management module 350 checks whether the buffer module 360 has an available buffer space (S535).

If it is determined in step S535 that no available buffer space exists, a page to be recorded in the disk module 380 is selected, and the page LSN of the selected page is processed (S540). This process will be described in detail below.

First, if the page LSN of a specific page selected by the data buffer 362 is MAX_LSN, the selected page that has been in the free page list is newly allocated in a transaction. Therefore, the storage management module 370 changes the page LSN of the selected page to a specific LSN before recording the selected page in the disk module 380. In this case, it is preferable that the changed LSN be the maximum LSN in the system. If the page LSN of the specific page selected by the data buffer 362 is not MAX_LSN, the storage management module 370 records the selected page in the disk module 380 without changing the page LSN of the selected page.

If an available buffer space is formed in the buffer module 360 in this way, the buffer management module 350 checks whether the requested page is a page to be newly allocated (S545).

If it is determined that the requested page is not a newly allocated page, the storage management module 372 duplicates the requested disk page on the data buffer 362 designated by the buffer management module 350 (S555), and the index/record/catalog management module 340 changes the data value of the corresponding page (S560).

If it is determined in step S545 that the requested page is a newly allocated page, the newly allocated page is processed (S550), which will be described in detail below.

First, if an available free page exists in the free page list, the page usage management module 372 allocates a new page in the free page list. On the other hand, if an available free page does not exist in the free page list, the page usage management module 372 allocates a new page in the non-committed free page list.

If a new page is allocated from the free page list, log information on a change in the data values of the page is not created until a corresponding disk page is loaded onto the data buffer 362 and is then recorded in the disk module 380. The storage management module 370 does not read out the corresponding disk page from the disk module 380, and the buffer management module 350 sets the page LSN of a designated buffer page to MAX_LSN indicating that the page is newly allocated from the free page list.

If a new page is allocated from the non-committed free page list due to no free page existing in the free page list, the disk module 380 reads out the corresponding page into a designated buffer space.

If the page is updated in operation S560, log information on the updated page is processed (S565).

In the related art, log information is always created whenever the data value of a certain page is updated. However, in an exemplary embodiment of the invention, after the index/record/catalog management module 340 updates the data value in operation S560, it is determined whether log information on a corresponding page needs to be created. More specifically, if the page LSN of the corresponding page loaded onto the buffer module 360 is MAX_LSN, the index/record/catalog management module 340 does not create log information.

Figure 6:
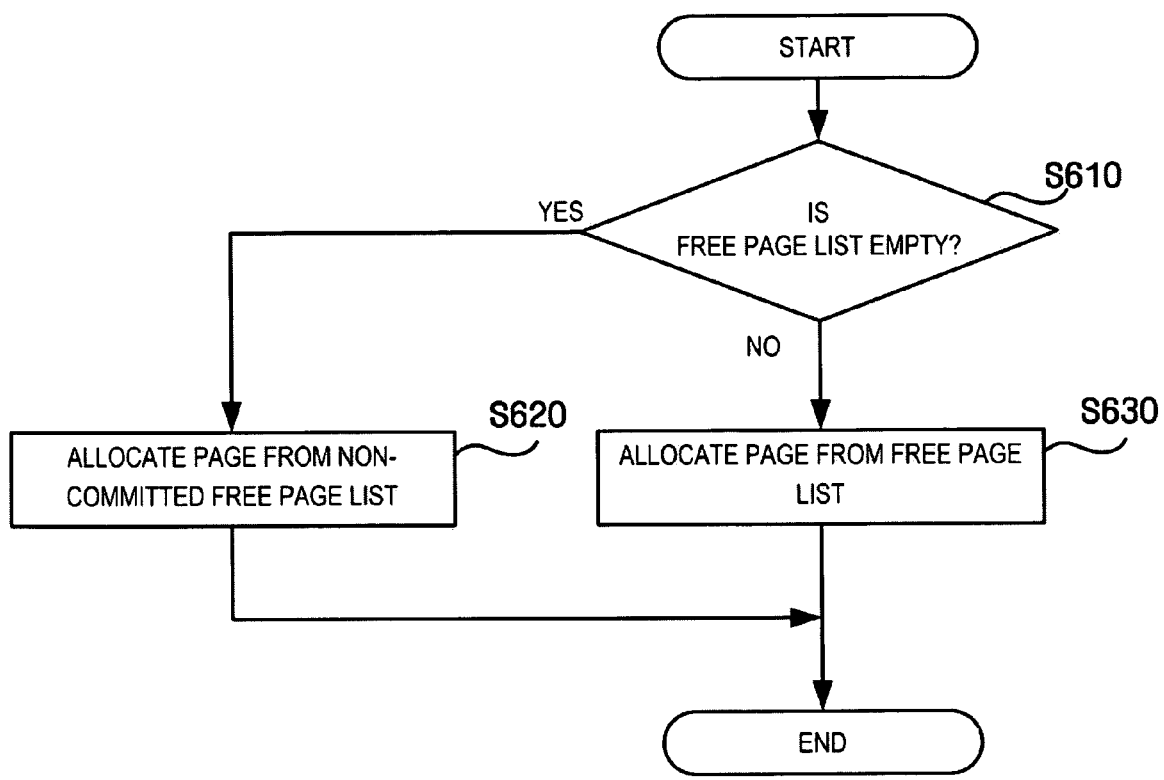
FIG. 6 is a flowchart illustrating a process of newly allocating a disk page according to an exemplary embodiment of the invention.

FIG. 6 is a flowchart illustrating a process of newly allocating a disk page according to an exemplary embodiment of the invention.

Referring to FIG. 6, the page usage management module 372 checks whether the free page list is empty (S610). If the free page list is empty, the page usage management module 372 selects a first page from the non-committed free page list and allocates the first page (S620). On the other hand, if the free page list is not empty, the page usage management module 372 selects the first page from the free page list and allocates the first page (S630).

Figure 7:
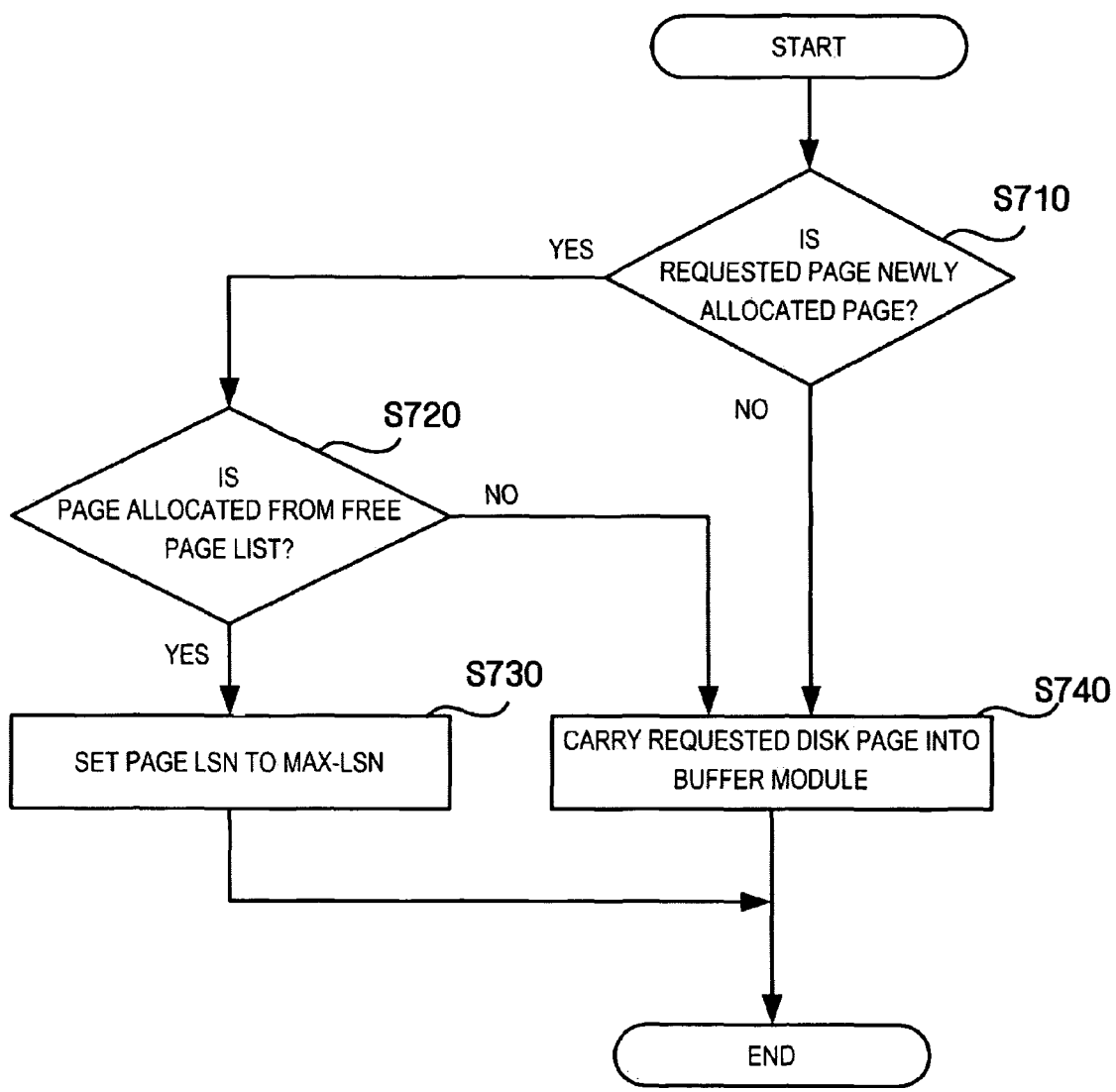
FIG. 7 is a flowchart illustrating a process of carrying a newly allocated disk page into a buffer according to an exemplary embodiment of the invention.

FIG. 7 is a flowchart illustrating a process of carrying a disk page newly allocated into a buffer according to an exemplary embodiment of the invention.

The storage management module 370 checks whether a requested page is a newly allocated page (S710). If the requested page is a newly allocated page, the storage management module 370 checks whether the newly allocated page is allocated from the free page list (S720). If the newly allocated page is allocated from the free page list, the page LSN of a corresponding space in the data buffer 362 (that is, a buffer page of the buffer module 360 onto which the disk page is loaded) is set to MAX_LSN (S730). In this way, the process of carrying the disk page that is newly allocated into the buffer module 360 is completed.

However, if the requested page is not the newly allocated page in operation S710 or if the newly allocated page is not allocated from the free page list in operation S720 (for example, if the newly allocated page is a new page allocated from the non-committed free page list), the storage management module 370 reads out the corresponding disk page from the disk module 380 and loads the read disk page onto the data buffer 360 of the buffer module 360.

In order to perform the process shown in FIG. 7, the storage management module 370 communicates with the buffer management module 350 that manages the buffer module 360.

Figure 8:
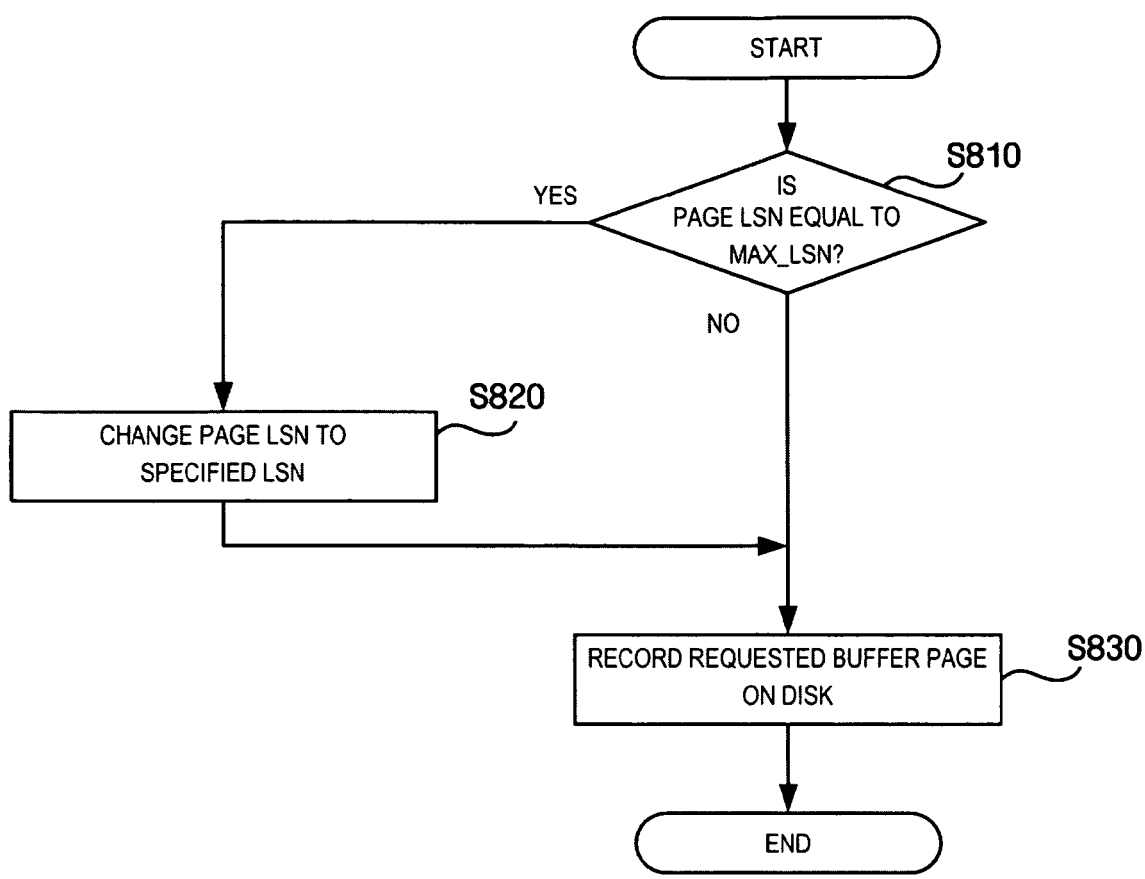
FIG. 8 is a flowchart illustrating a process of carrying a page from a buffer to a disk according to an exemplary embodiment of the invention.

FIG. 8 is a flowchart illustrating a process of carrying a page from a buffer to a disk according to an exemplary embodiment of the invention.

Referring to FIG. 8, the storage management module 370 checks whether the page LSN of a page to be recorded in the disk module 380 is MAX_LSN (S810). If the page LSN of the page is MAX_LSN, the page LSN is set to a specified LSN (S820), and a buffer page requested by the data buffer 362 of the buffer module 360 is recorded in the disk module 380 (S830). On the other hand, if it is determined in step S810 that the page LSN of the page is not MAX_LSN, the buffer page requested by the data buffer 362 of the buffer module 360 is recorded in the disk module 380 (S830).

In order to perform the process shown in FIG. 8, the storage management module 370 communicates with the buffer management module 350 that manages the buffer module 360.

Figure 9:
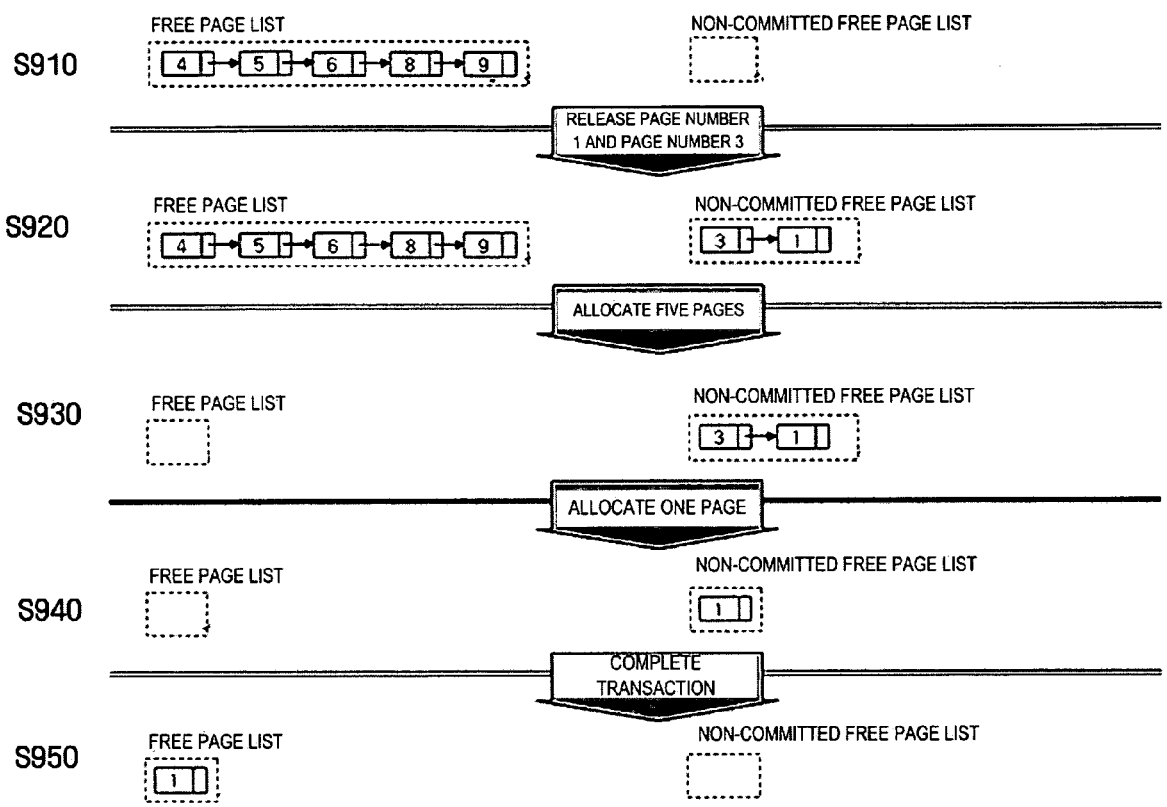
FIG. 9 is a flowchart illustrating a process of updating a free page list and a non-committed free page list according to an exemplary embodiment of the invention.

FIG. 9 is a diagram illustrating a process of updating a free page list and a non-committed free page list according to an exemplary embodiment of the invention. The update process may be performed by the page usage management module 372 of the storage management module 370.

As shown in FIG. 9, the free page list has five free pages, and the non-committed free page list is empty (S910). The empty non-committed free page list means that there is no disk page released in a transaction that has not been finished yet.

If page No. 1 and page No. 3 are released, the page No. 1 and page No. 3 are put on the non-committed free page list, but there is no change in the free page list (S920).

Then, if five disk pages are allocated, pages on the free page list are allocated, which causes the free page list to be empty. However, there is no change in the non-committed free page list (S930).

Subsequently, if one page is further allocated, the page No. 3 in the non-committed free page list is allocated. As a result, only the page No. 1 remains as a free page in the non-committed free page list (S940).

Finally, after the transaction having released the page No. 1 and the page No. 3 is finished, free pages on the non-committed free page list are annexed to the free page list. As a result, the free page list has the page No. 1 that has been on the non-committed free page list, which causes the non-committed free page list to be empty (S950).

Figure 10:
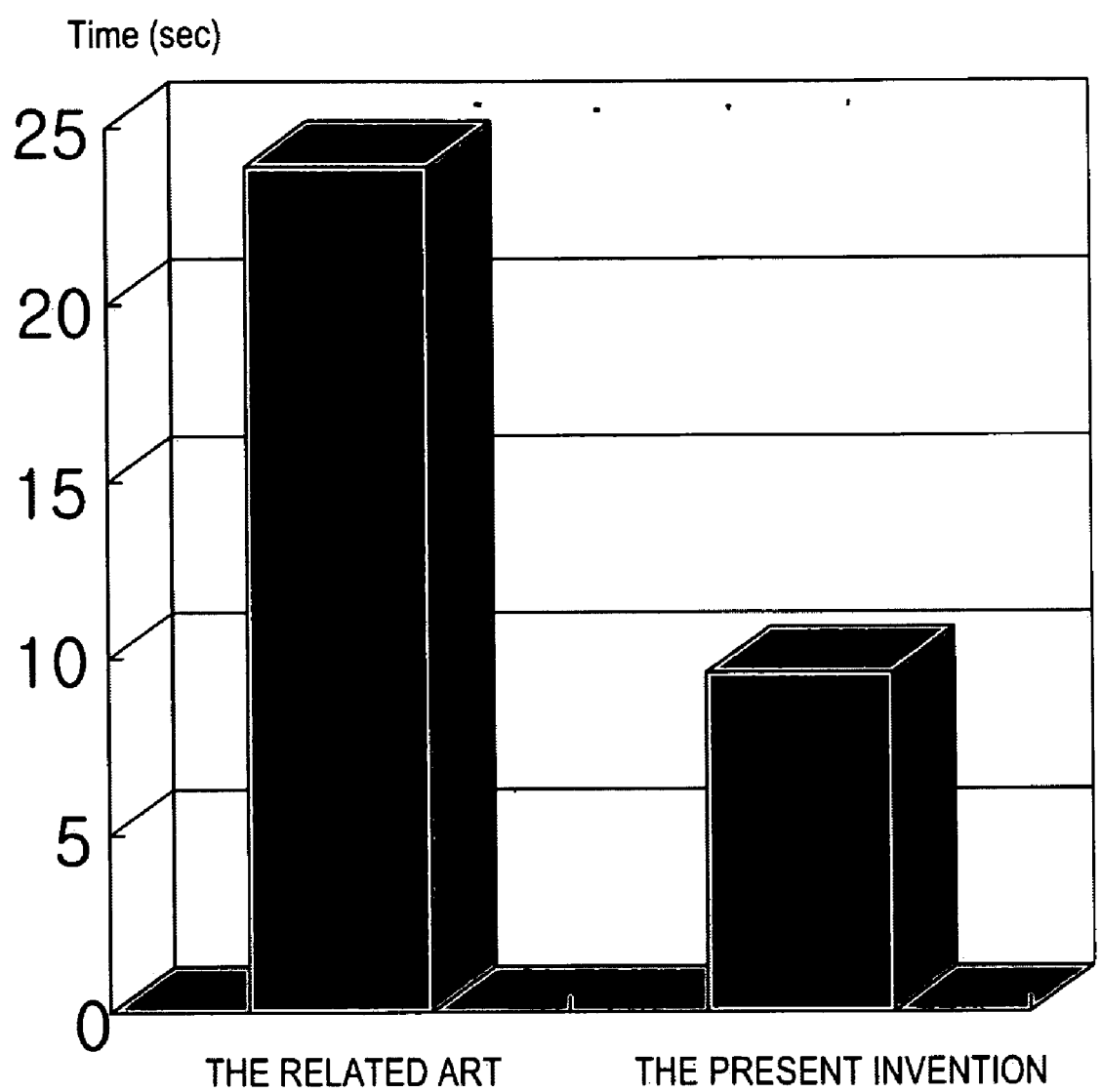
FIG. 10 is a graph illustrating the results of the experiment according to an exemplary embodiment of the invention.

FIG. 10 is a graph illustrating the results of the experiment according to an exemplary embodiment of the invention, and shows a comparison between the processing speed of the present invention and the processing speed of the related art when 3000 records are newly inserted.

In this case, one record is composed of eleven fields, and nine of the eleven fields are indexed. One record has a size of 210 bytes.

Referring to FIG. 10, in the related art, it takes about 25 seconds to newly insert 3000 records. However, according to the present invention, it takes about 10 seconds to newly insert 3000 records, and thus an insertion performance is improved about two and a half times, as compared with the related art. In addition, according to an exemplary embodiment of the invention, the amount of log information is reduced, which causes the time required for recovery to be reduced to about 1/50.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to an exemplary embodiment of the invention, even if a large number of new pages are allocated, a log information management system can minimize the amount of log information on the allocated pages, which makes it possible to reduce the cost of writing information on a disk.

Further, according to an exemplary embodiment of the invention, a page that is newly allocated is not read from a disk, which makes it possible to reduce the cost of reading information from the disk.

Furthermore, according to an exemplary embodiment of the invention, the amount of log information on a page that is newly allocated is reduced to the minimum. Therefore, even if data is recovered, a response speed is improved.

What is claimed is:

1. A log information management system comprising:
an index/record/catalog management circuit which determines whether a page to be updated is a newly allocated page;

a storage management circuit which manages a free page list and a non-committed free page list, allocates a new page from the free page list if the index/record/catalog management circuit determines that the page to be updated is newly allocated, and allocates a new page from the non-committed free page list if the free page list is empty; and a buffer management circuit which prevents log information from being created for the newly allocated page during a transaction by setting a page log sequence number included in identification information on a buffer page corresponding to the newly allocated page to a maximum log sequence number, wherein, if a page log sequence number of a page in a buffer managed by the buffer management circuit corresponds to a maximum value, the storage management circuit changes the page log sequence number to a specified log sequence number before recording the page on a disk, wherein log information is created upon completion of a transaction if the page log sequence number included in the identification information is not set to a maximum log sequence number.

2. The log information management system of claim 1, wherein, if the new page is allocated from the non-committed free page list, the storage management circuit reads a corresponding page from a disk into a designated space in a buffer.

3. The log information management system of claim 1, wherein, if a page log sequence number of a page in a buffer managed by the buffer management circuit is less than a maximum value, the index/record/catalog management circuit creates log information on a page whose data value is updated.

4. The log information management system of claim 1, wherein the storage management circuit comprises a page usage management module.

5. The log information management system of claim 2, wherein the buffer comprises a data buffer and a log buffer.

6. The log information management system of claim 1, wherein non-allocated pages on the non-committed free page list are transferred to the free page list when a transaction is completed or stopped.

7. A computer readable storage medium having stored therein a program for causing a computer to execute a method of managing log information, the program including computer executable instructions for performing steps comprising:

determining whether a page to be updated is newly allocated;

allocating a new page from a free page list if it is determined that the page to be updated is newly allocated;

allocating a new page from a non-committed free page list if the free page list is empty;

setting a page log sequence number included in identification information on a buffer page corresponding to the newly allocated page to a maximum log sequence number which prevents log information from being created for the newly allocated page during a transaction; and changing a page log sequence number to a specified log sequence number before recording the buffer page on the disk if the page log sequence number of the buffer page corresponds to a maximum value, wherein log information is created upon completion of a transaction.

8. The computer readable storage medium having stored therein a program as defined in claim 7 wherein, if the new page is allocated from the non-committed free page list, the allocating of the new page includes loading the allocated new page from a disk onto a designated buffer space.

9. The computer readable storage medium having stored therein a program as defined in claim 7, further comprising creating log information on the buffer page if a page log sequence number of the buffer page is less than a maximum value.

10. The computer readable storage medium having stored therein a program as defined in claim 7, further comprising transferring the non-allocated pages on the non-committed free page list to the free page list if a transaction is completed or stopped.

* * * * *